United States Patent
Mohanraj et al.

(10) Patent No.: US 12,280,568 B2
(45) Date of Patent: *Apr. 22, 2025

(54) PRE-APPLIED MEMBRANES

(71) Applicant: BRITISH POLYTHENE LIMITED, Northamptonshire (GB)

(72) Inventors: Jagan Mohanraj, Derbyshire (GB); Cameron Yates, Derbyshire (GB)

(73) Assignee: BRITISH POLYTHENE LIMITED, Northamptonshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,200

(22) Filed: May 25, 2023

(65) Prior Publication Data

US 2023/0294385 A1    Sep. 21, 2023

Related U.S. Application Data

(63) Continuation of application No. 17/291,529, filed as application No. PCT/GB2019/053129 on Nov. 5, 2019, now Pat. No. 11,691,396.

(30) Foreign Application Priority Data

Nov. 6, 2018    (GB) ..................................... 1818077

(51) Int. Cl.
*B32B 25/08*     (2006.01)
*B32B 7/06*      (2019.01)
(Continued)

(52) U.S. Cl.
CPC ................ *B32B 25/08* (2013.01); *B32B 7/06* (2013.01); *B32B 25/18* (2013.01); *B32B 27/18* (2013.01);
(Continued)

(58) Field of Classification Search
CPC ............ B32B 2250/02; B32B 2250/03; B32B 2250/24; B32B 2255/10; B32B 2255/26; B32B 2264/10; B32B 2264/104; B32B 2270/00; B32B 2272/00; B32B 2307/716; B32B 2307/7242; B32B 2307/7265; B32B 2307/732; B32B 2419/00; B32B 25/02; B32B 25/08; B32B 25/12; B32B 25/18; B32B 27/18; B32B 27/306; B32B 27/32;
(Continued)

(56) References Cited

U.S. PATENT DOCUMENTS

| 5,854,327 | A | 12/1998 | Davis et al. | |
| 11,691,396 | B2 * | 7/2023 | Mohanraj | E04B 1/665 |
| | | | | 428/220 |
| 2013/0104495 | A1 | 5/2013 | Wiercinski et al. | |

FOREIGN PATENT DOCUMENTS

| CN | 107857901 | 3/2018 |
| CN | 108360694 | 8/2018 |

(Continued)

OTHER PUBLICATIONS

CN 107351486 A, Nov. 17, 2017.*

(Continued)

*Primary Examiner* — Lawrence D Ferguson
(74) *Attorney, Agent, or Firm* — Nicholas J. Landau; Erin Gaddes; Maynard Nexsen PC

(57) ABSTRACT

A laminated pre-applied membrane is provided. The membrane comprises a layer of polyethylene and a rubber or rubber-based layer.

30 Claims, 2 Drawing Sheets

(51) Int. Cl.
  *B32B 25/18*   (2006.01)
  *B32B 27/18*   (2006.01)
  *B32B 27/30*   (2006.01)
  *B32B 27/32*   (2006.01)
  *C08K 3/26*    (2006.01)
  *C08K 3/34*    (2006.01)

(52) U.S. Cl.
  CPC ............ *B32B 27/306* (2013.01); *B32B 27/32* (2013.01); *C08K 3/26* (2013.01); *C08K 3/346* (2013.01); *B32B 2250/24* (2013.01); *B32B 2270/00* (2013.01); *B32B 2272/00* (2013.01); *B32B 2307/716* (2013.01); *B32B 2307/7242* (2013.01); *B32B 2307/7265* (2013.01); *B32B 2307/732* (2013.01); *C08K 2003/265* (2013.01)

(58) Field of Classification Search
  CPC ... B32B 27/327; B32B 7/06; C08K 2003/265; C08K 3/26; C08K 3/346; C08L 17/00; C08L 21/00; C08L 2207/20; C08L 23/22; C08L 9/02; E04B 1/665
  See application file for complete search history.

(56) References Cited

FOREIGN PATENT DOCUMENTS

| | | |
|---|---|---|
| EP | 1193283 | 8/2001 |
| WO | PCTUS2010020583 | 8/2010 |
| WO | PCTUS2015052814 | 4/2017 |

OTHER PUBLICATIONS

Gatinet, Bruno "International Search Report and Written Opinion" PCT/GB2019/053129; Jan. 28, 2020.

Mthupha, Albert Dr. "United Kingdom patent search" GB1818077.8 May 14, 2019.

\* cited by examiner

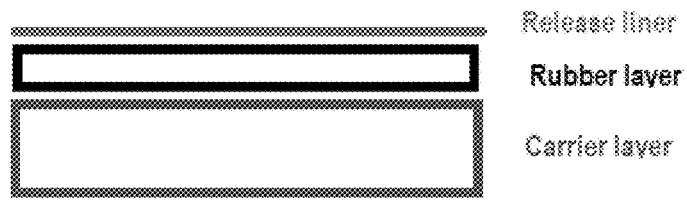

FIG. 1

| COMPONENT | PATENT BLEND | COMMENT |
|---|---|---|
| Synthetic Rubber | 67 | Blend of virgin or reclaimed nitrile/butyl rubber |
| Mineral additive | 20 | chalk, metakaolin |
| Process aids | 13 | stabilising agents, softening agents/tackifier, colour (carbon black) |
| | 100% | |

FIG. 2

| COMPONENT | PATENT BLEND | COMMENT |
|---|---|---|
| Synthetic Rubber | 67 | Blend of virgin or reclaimed nitrile/butyl rubber |
| Mineral additive | 20 | chalk, metakaolin |
| Process aids | 13 | stabilising agents, softening agents/tackifier, colour (carbon black) |
| | 100% | |

FIG. 3

| COMPONENT | PATENT BLEND | COMMENT |
|---|---|---|
| PVOH | 50 | |
| Mineral additive | 50 | metakaolin |
| | 100% | |

FIG. 4

| Sample | Metakaolin added | Peel force (N/5cm)* (t = 72 hours) | | | | | |
|---|---|---|---|---|---|---|---|
| | | 1 | 2 | 3 | 4 | 5 | Mean |
| 1 | No | 1.40 | 1.30 | 1.20 | 1.40 | 1.40 | 1.34 |
| 2 | Yes | 7.12 | 7.10 | 7.30 | 7.10 | 7.00 | 7.12 |

PRE-APPLIED MEMBRANES

CROSS-REFERENCE TO RELATED APPLICATIONS

This application is continuation under 35 U.S.C. § 120 of U.S. patent application Ser. No. 17/291,529, which entered the national stage on 5 May 2021 (pending). U.S. patent application Ser. No. 17/291,529 a national stage under 35 U.S.C. 371 of International Application No. PCT/GB2019/053129 having an international filing date of 5 Nov. 2019. International Application No. PCT/GB2019/053129 cites the priority of Great Britain Patent Application No. 1818077.8, filed on 6 Nov. 2018 (currently pending). International Application No. PCT/GB2019/053129 is incorporated herein by reference in its entirety.

DETAILED DESCRIPTION

The present invention relates generally to a pre-applied membrane.

Pre-applied membranes are positioned on the underside prior to the pouring of concrete over them. This type of sheet-like membrane is used for various purposes, including structural waterproofing and gas protection.

In order to ensure that the membrane functions it is important for there to be an intimate bond between the membrane and the post-poured building material after it sets.

An aspect of the present invention provides a laminated pre-applied membrane comprising a layer of polyethylene and a rubber or rubber-based layer.

The rubber or rubber-based layer may include a mineral additive

The mineral additive may comprise kaolin.

The mineral additive may comprise kaolinite.

The mineral additive may comprise metakaolin.

The mineral additive may comprise calcium carbonate.

The polyethylene (PE) layer may be a film having a thickness of approximately 1 mm.

An aspect of the present invention provides a pre-applied membrane comprising a base layer and a rubber or rubber-based layer, in which the rubber or rubber-based layer includes a mineral additive, and in which the mineral additive comprises kaolin and/or kaolinite.

In its natural state kaolin is a white, soft powder consisting principally of the mineral kaolinite.

The term kaolinite describes the name of a group of closely-related clay minerals, as well as an individual member mineral of the group. The members of the Kaolinite group all have the same (or similar) chemical formula, and they are Dickite, Kaolinite, Nacrite, Halloysite, and Odinite. Kaolinite also has a very similar chemical formula to Serpentine, and is sometimes considered a member of the Serpentine group.

An aspect of the present invention provides a pre-applied membrane comprising a base layer and a rubber or rubber-based layer, in which the rubber or rubber-based layer includes a mineral additive, and in which the mineral additive comprises metakaolin.

The present inventors have found that the addition of metakaolin can, for example, be used to augment the initial bond between the membrane and the building material, and significantly reduces the bonding time.

Metakaolin is a dehydroxylated form of the clay mineral kaolinite.

The base layer may be a plastics layer.

The base layer may comprise one or more of: low density polyethylene (LDPE) low linear density polyethylene (LLDPE), medium density polyethylene (MDPE), high density polyethylene (HDPE), ethylene vinyl alcohol (EVOH), Nylon (RTM) and other multi-layer film structures. In one embodiment the base layer is a PE or PE-based plastics layer.

The base layer can be used, for example, to provide mechanical properties, waterproofing and gas resistant properties for the membrane.

The present invention also provides a pre-applied membrane including a rubber layer, in which the rubber layer comprises a mineral additive and in which the mineral additive comprises kaolin and/or kaolinite, such as metakaolin.

In aspects and embodiments of the present invention the rubber layer or rubber-based layer comprises natural and/or synthetic rubber.

In some embodiments the rubber or rubber-based layer comprises butyl rubber, for example reclaimed butyl rubber or a blend of butyl and reclaimed rubber.

In some embodiments the rubber or rubber-based layer is a blend of virgin or reclaimed nitrile and butyl rubber.

In some embodiments a mineral additive is mixed into the rubber or rubber-based layer. Alternatively or additionally a mineral additive may be embedded in an upper surface of the rubber or rubber-based layer. Embodiments in which, for example, metakaolin, is physically blended on the surface of the rubber layer onto which the building material is applied may be advantageous.

The membrane may further comprise one or more process aids, such as one or more of: stabilising agents; softening agents; tackifiers; and colourants.

The membrane may further comprise a removable release sheet. This is useful, for example, for allowing the membrane to be rolled up and not sticking to itself.

The release sheet/liner/layer may have a thickness in the range 0.03 mm to 0.15 mm.

The rubber or rubber-based layer may have a thickness in the range 0.4 mm to 1.0 mm.

The base layer may have a thickness in the range 0.55 mm to 1.25 mm.

The mineral additive may be present in an amount of 5% to 40% by weight.

The mineral additive may further comprise calcium carbonate or the like.

The present invention also provides a membrane that bonds to cement mortar or concrete cast against it, comprising a carrier layer and a rubber or rubber-based layer, in which a release liner is provided on the rubber or rubber-based liner, and in which the release liner is dissolvable.

The release liner may be water soluble and/or pH soluble. The intention being that the liner dissolves in use, for example when concrete is poured onto the membrane.

The release liner and/or the rubber or rubber-based layer may include a mineral additive, the mineral additive comprising kaolin and/or kaolinite, such as metakaolin.

The carrier layer may comprise one or more of: LLDPE, LDPE, MDPE, HDPE, EVOH Nylon (RTM) and other multi-layer film structures.

The release liner may be formed from PVOH. Poly(vinyl alcohol) (PVOH, PVA, or PVAI) is a water-soluble synthetic polymer.

A membrane as claimed in any preceding claim, comprising a laminated structure with a layer of PE and a layer of rubber.

The present invention also provides a waterproofing membrane comprising a membrane as described herein.

The present invention also provides a gas barrier membrane comprising a membrane as described herein.

The present invention also provides a rubber or rubber-based material comprising calcium carbonate and/or kaolin and/or kaolinite, such as metakaolin.

The present invention also provides a rubber or rubber-based material for a pre-applied membrane, the material comprising calcium carbonate and/or kaolin and/or kaolinite, such as metakaolin.

The present invention also provides for a construction site having one or more membranes as described herein.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combinations other than those explicitly set out in the claims.

The present invention is more particularly shown and described, by way of example, in the accompanying drawings.

The example embodiments are described in sufficient detail to enable those of ordinary skill in the art to embody and implement the systems and processes herein described. It is important to understand that embodiments can be provided in many alternative forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In the description, all orientational terms, such as upper, lower, radially and axially, are used in relation to the drawings and should not be interpreted as limiting on the invention.

BRIEF DESCRIPTION OF THE DRAWINGS

FIG. 1 shows an example of a membrane formed in accordance with the present invention.

FIG. 2 shows an example of the constituents of a rubber layer formed in accordance with the present invention.

Figures 5, 6:
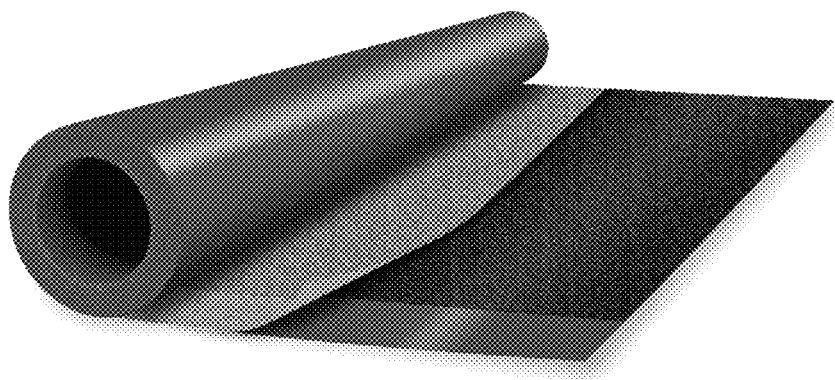

In other embodiments different percentages of components can, of course, be used; for example:

| | |
|---|---|
| Rubber | 30% to 75% |
| Mineral Additive | 1% to 30% |
| Process Aids | 5% to 30% |

The mineral additive may, for example be: calcium carbonate and/or kaolin and/or kaolinite and/or metakaolin.

FIG. 3 shows an example of the constituents of a rubber layer useful in conjunction with a dissolvable release liner formed in accordance with the present invention.

FIG. 4 shows the constituents of a dissolvable release liner formed in accordance with the present invention.

FIG. 5 below illustrates the improved bond strength between membrane and the concrete after 3 days.

*Sample area=125 $cm^2$ (5 cm wide by 25 cm long). i.e. the rubber layer of this area size is in contact with the concrete. 180 degree peel adhesion test performed.

The force required to peel of the sample area is recorded above. When comparing sample I (control sample with no additive) to sample 2 (sample with mineral additive), the force required to pull sample 2 away from the concrete was more than 5 times than sample I.

FIG. 6 shows an example of a roll of structural waterproofing pre-applied membrane.

The membrane is a laminated structure with a layer of PE and a butyl rubber layer. In this embodiment a release layer is included.

The PE layer provides puncture resistance. The rubber layer chemically engages with concrete in use.

The dimensions shown are non-limiting.

The rubber layer may have a mineral additive.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The following is claimed:

1. A laminated pre-applied membrane comprising a carrier layer and a rubber or rubber-based layer; wherein the carrier layer comprises a polyethylene layer; and wherein the rubber or rubber-based layer comprises: a blend of virgin rubber and reclaimed rubber, and at least one mineral additive selected from the group consisting of kaolin, kaolinite and metakaolin.

2. The membrane according to claim 1, wherein the polyethylene layer is a layer of: low density polyethylene, linear low density polyethylene, medium density polyethylene or high density polyethylene.

3. The membrane according to claim 1, wherein the polyethylene layer is a polyethylene film layer.

4. The membrane according to claim 1, wherein the carrier layer comprises the polyethylene layer and at least one additional layer selected from layers of low density polyethylene, linear low density polyethylene, medium density polyethylene, high density polyethylene, ethylene vinyl alcohol and nylon.

5. The membrane according to claim 1, wherein the mineral additive comprises a kaolin.

6. The membrane according to claim 1, wherein the mineral additive comprises kaolinite or metakaolin.

7. The membrane according to claim 1, wherein the rubber or rubber-based layer comprises a butyl rubber.

8. The membrane according to claim 7, wherein the butyl rubber comprises reclaimed butyl rubber.

9. The membrane according to claim 7, wherein the rubber or rubber-based layer comprises a blend of virgin butyl rubber and reclaimed butyl rubber.

10. The membrane according to claim 7, wherein the butyl rubber is a nitrile butyl rubber.

11. The membrane according to claim 9, wherein at least one of the virgin butyl rubber and the reclaimed butyl rubber is a nitrile butyl rubber.

12. The membrane according to claim 1, wherein the carrier layer has a thickness in the range 0.55 mm to 1.25 mm; or approximately 1 mm; and/or the rubber or rubber-based layer has a thickness in the range 0.4 mm to 1.0 mm.

13. The membrane according to claim 1, wherein the mineral additive is mixed into the rubber or rubber-based layer.

14. The membrane according to claim 1, wherein the mineral additive is embedded in or on an upper surface of the rubber or rubber-based layer.

15. The membrane according to claim 1, wherein the rubber or rubber-based layer further comprises at least one process aid selected from the group consisting of stabilising agents; softening agents; tackifiers and colourants.

16. The membrane according to claim 1, further comprising a release sheet provided on or over the rubber or rubber-based layer, wherein the release sheet is a removable release sheet or a dissolvable release sheet.

17. The membrane according to claim 16, wherein the release sheet has a thickness in the range 0.03 mm to 0.15 mm.

18. A waterproofing membrane or gas-barrier membrane comprising a membrane as claimed in claim 1.

19. A laminated pre-applied membrane comprising a carrier layer and a rubber or rubber-based layer, wherein the carrier layer comprises a polyethylene layer and wherein the rubber or rubber-based layer comprises a blend of virgin rubber and reclaimed rubber and comprises a mineral additive.

20. The membrane according to claim 19, wherein the rubber or rubber-based layer comprises a blend of virgin butyl rubber and reclaimed butyl rubber.

21. The membrane according to claim 19, wherein the butyl rubber is a nitrile butyl rubber.

22. The membrane according to claim 20, wherein at least one of the virgin butyl rubber and the reclaimed butyl rubber is a nitrile butyl rubber.

23. The membrane according to claim 19, wherein the mineral additive comprises at least one mineral additive selected from the group consisting of kaolin, kaolinite, metakaolin, chalk and calcium carbonate.

24. The membrane according to claim 19, wherein the carrier layer has a thickness in the range 0.55 mm to 1.25 mm; or approximately 1 mm; and/or the rubber or rubber-based layer has a thickness in the range 0.4 mm to 1.0 mm.

25. The membrane according to claim 19, wherein the mineral additive is mixed into the rubber or rubber-based layer.

26. The membrane according to claim 19, wherein the mineral additive is embedded in or on an upper surface of the rubber or rubber-based layer.

27. The membrane according to claim 19, wherein the rubber or rubber-based layer further comprises at least one process aid selected from the group consisting of stabilising agents; softening agents; tackifiers and colourants.

28. The membrane according to claim 19, further comprising a release sheet provided on or over the rubber or rubber-based layer, wherein the release sheet is a removable release sheet or a dissolvable release sheet.

29. The membrane according to claim 28, wherein the release sheet has a thickness in the range 0.03 mm to 0.15 mm.

30. A waterproofing membrane or gas-barrier membrane comprising a membrane as claimed in claim 19.

\* \* \* \* \*